Jan. 30, 1951     A. W. LUNDELL     2,539,448
COMMODITY CHOPPER CASING

Filed June 26, 1948     4 Sheets-Sheet 1

INVENTOR.
ARNOLD W. LUNDELL
BY Gustav Drew
his ATTORNEY

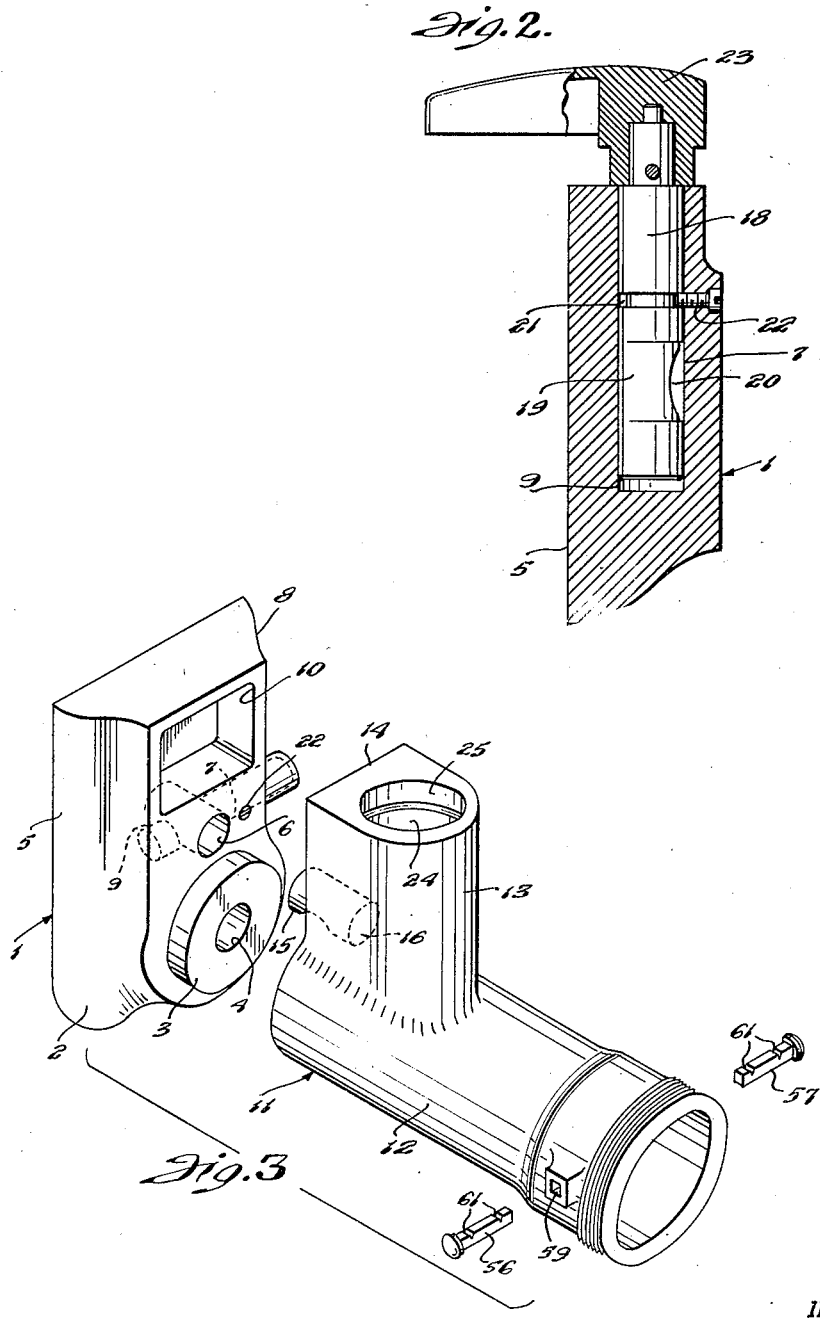

Jan. 30, 1951  A. W. LUNDELL  2,539,448
COMMODITY CHOPPER CASING
Filed June 26, 1948  4 Sheets-Sheet 3

INVENTOR.
ARNOLD W. LUNDELL
BY Gusta Drews
his ATTORNEY

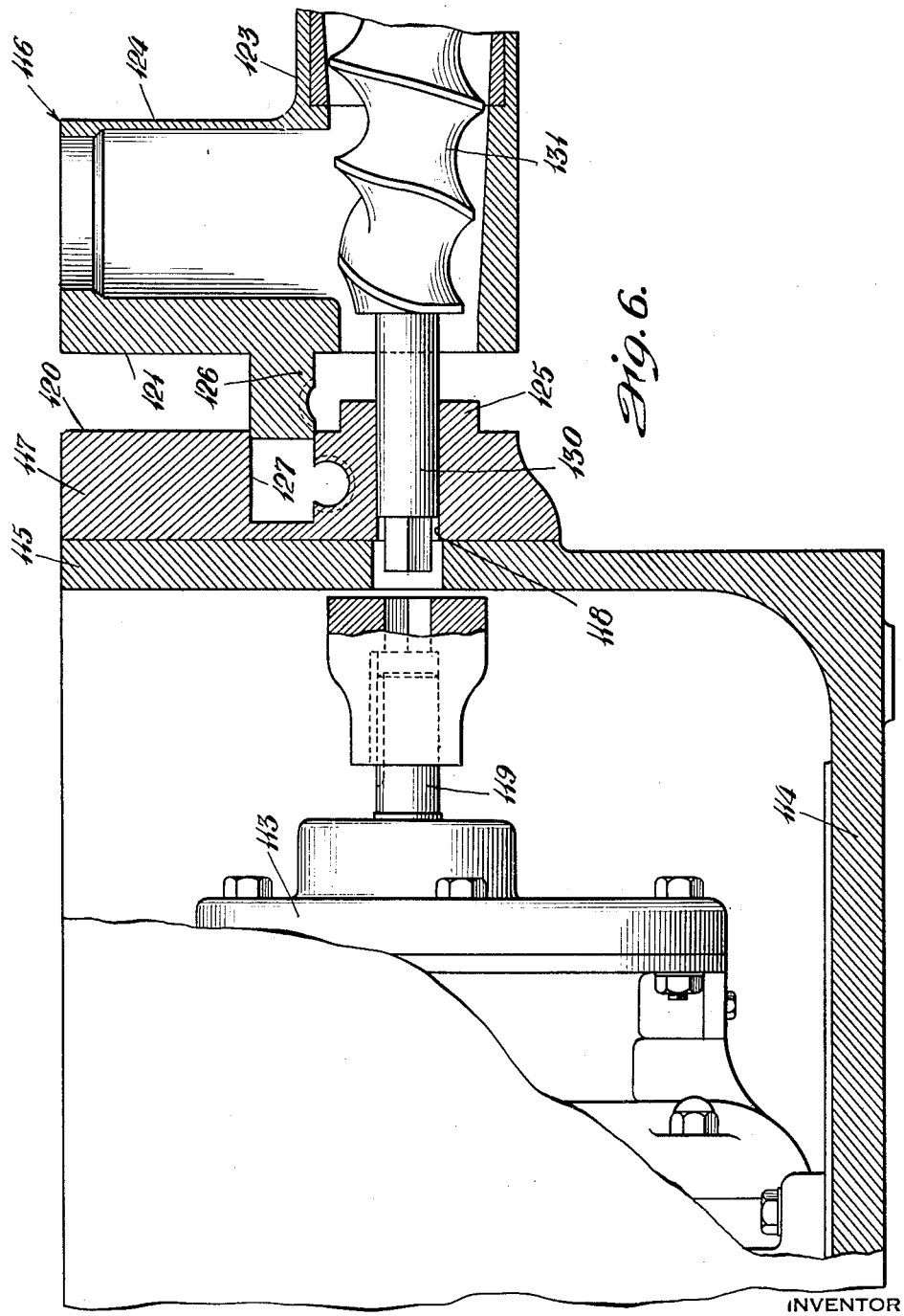

Patented Jan. 30, 1951

2,539,448

UNITED STATES PATENT OFFICE 2,539,448

COMMODITY CHOPPER CASING

Arnold W. Lundell, East Portchester, Conn., assignor to Globe Slicing Machine Co., Inc., Stamford, Conn., a corporation of New York Application June 26, 1948, Serial No. 35,402

4 Claims. (Cl. 146—182)

This invention relates to commodity chopper casing in general and more especially to the casings of meat choppers.

With the conventional meat choppers in use today, it has long been a problem how properly to clean the same. Meat particles if left in the meat chopper over night will spoil, and not only transmit an objectionable odor, but will affect the odor, taste and sanitary condition of any fresh supply of meat processed through the chopper if the old meat particles have not been effectively removed. The extensive pockets in conventional meat choppers constitute a difficulty to be overcome, particularly if the main chambered portion was not readily removable. In the interest of solving this problem, it has been suggested to remove the chopper head with the advancing screw and cutter intact and place it in a refrigerator over night from one day's work to the next. Many merchants, on the other hand, have actually erected their meat choppers in the refrigerator and process all meat through the meat chopper in the refrigerator with a view to solving this problem. To this end the present invention aims to provide a construction that may be speedily and effectively cleaned so that the meat chopping process may be effected outside of the refrigerator and in the open store, if desired.

More specifically to this end, among other objects it is aimed to provide an improved meat chopper casing including a fixed section and a removable section, the removable section of which is provided with a chambered inlet portion and a main chambered portion in communication with said inlet portion, the main chambered portion serving to enclose a cutting means at one end thereof and an advancing means rotatably mounted therein, and the fixed section forming a supporting abutment for the inlet portion, a journal for the driven shaft of the advancing means and a closure for one end of the main chambered portion, which main chambered portion is provided with longitudinally extending ribs affording a clear passage from one end to the other thereof without pockets and the like, with the openings at the ends thereof being substantially co-extensive in area with the cross section of the main chamber to facilitate cleaning the interior of the removable section by drawing a brush cleaning implement or the like through the removable section when detached.

It is still another object of the present invention to provide an improved meat chopper casing of the type aforesaid having fixed and removable sections in which the sections are provided with centering or indexing means outside of the periphery of the main chambered portion of the removable section to aline an annulus on one section with the chambered portion of the other section, in turn to position the removable section in final assembled position when attaching the same.

It is still another object of the present invention to provide an improved meat chopper casing of the type aforesaid having fixed and removable sections, the fixed section of which includes not only the journal for the driven shaft of the advancing means, but also an abutment for an indexing or centering element associated with the removable section to cooperate with the driven shaft quickly to position the removable section when attaching the same.

It is still another object of the present invention to provide for an improved two part casing devised in the interest of sanitation and access to the interior thereof, an improved lock to facilitate anchoring the parts to one another and in turn to facilitate separating the parts from one another without the use of tools and the like.

It is still another object of the present invention, in an improved meat chopper casing of the type aforesaid in which the sections are provided with centering or indexing means, to provide an improved lock or anchoring means which will cooperate with the centering means to draw the sections together, that is, to draw the removable section toward the fixed section into final assembled position when attaching the same.

These and other features, capabilities and advantages of the invention will appear from the subjoined detail description of specific embodiments thereof illustrated in the accompanying drawings, in which Fig. 1 is a longitudinal section of the improved meat chopper.

Fig. 2 is a fragmental section on the line 4—4 of Fig. 1.

Fig. 3 is a perspective exploded view showing the two main parts of the two part casing before being anchored to one another.

Fig. 6 is a side view, partly in axial section, showing a power-driven commodity chopper with its casing partially separated from its support and thus illustrating the position of the parts when the casing is removed from or applied to its support.

Figure 1:
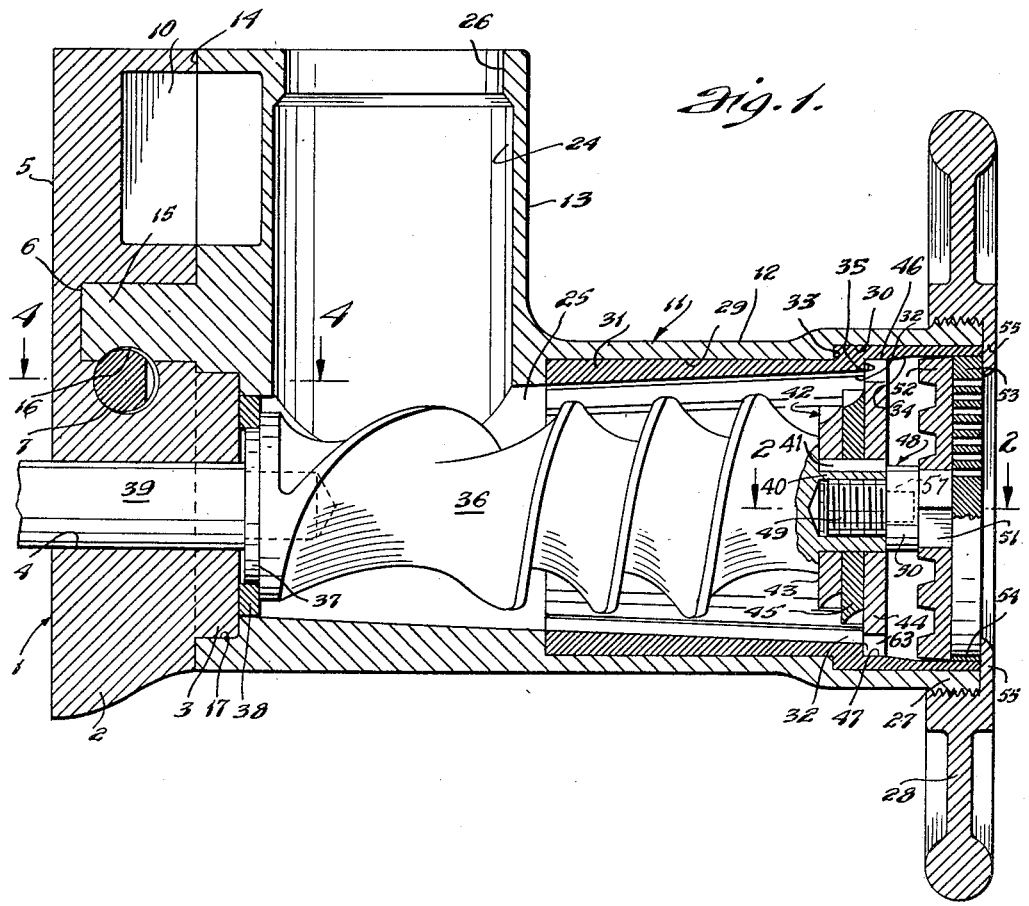

In the embodiment shown in Figs. 1 to 3, inclusive, there is provided a fixed casing part 1 having an enlargement 2 with a forwardly projecting annulus 3 through which extends the shaft opening 4 extending centrally of the annulus 3. Above the enlargement 2 there is provided the extension 5 having an enlarged opening 6 extending parallel, in the present instance, to the opening 4 and above the same, and a transversely extending opening 7 in communication with the opening 6 and partly intersecting the same, that is, extending from the side 8 of the extension 5 into communication with the opening 6 and then extending partly below and beyond the opening 6, see the portion 9 shown in dotted lines in Fig. 3. In order to reduce the weight of the casing part 1, the same is chambered at 10.

The removable casing portion 11 consists essentially of a longitudinally extending chambered portion 12 having extending upwardly therefrom the vertically extending chambered portion 13 with a substantially plane rear face 14 and a stout stud or projection 15 with a cylindrical outer face and indented arcuate recess 16.

In the opening 7 in the fixed casing part 1, there is rotatably mounted a pin 18 having an eccentric portion 19 and an arcuate recess 20 and also an annular recess 21 to receive the set screw 22, screw threadedly mounted in the extension 5. The pin 18 has a suitable handle 23 secured thereto for turning the same in either direction. When the handle 23 is turned so that the arcuate recess 20 of the pin 18 registers with the opening 6, the removable casing part 11 may be anchored to the fixed casing part 1 in the following manner. The stud 15 is registered with the opening 6 in the casing part 1, and the annulus 3 is registered with the enlarged annular recess 17 in the portion 12 of the casing part 11 and then the casing parts 1 and 11 are moved into one another or seated into one another so that the annulus 3 of the casing part 1 will be seated within the recess 17 of the casing part 11, and in turn the stud 15 of the casing part 11 will be seated within the recess 6 of the casing part 1, and then the pin 18 will be turned so that a raised part of the eccentric portion 19 will move into the arcuate recess 16 of the stud 15. It will also appear, when the projection 15 thus cooperates with the annulus 3 to center or index the removable section 12 quickly to position the removable section when attaching the same, that, when once centered, the turning of the handle 23 will cause the eccentric portion 19 to draw the section 11 toward the section 1, that is, to draw the sections toward one another into final assembled position.

The extension 13 is provided with a vertically extending chamber 24 in communication with the horizontally extending chamber 25 in the portion 12. In turn, in the present instance, the upper end of the chamber 24 is diminished by the shoulder portion 26. The chamber 25 preferably as shown is tapered, flaring outwardly as it extends from the casing part 1 to the outer discharge end 27 which is externally threaded, screw threadedly to receive the conventional locking ring 28.

In the embodiment shown in Figs. 1 to 3, inclusive, the portion 12 is provided with an outwardly flaring two-stepped recess including the intermediate recessed portion 29 and the outer recessed portion 30 conforming to the outer periphery of the removable sleeve 31 which has an inner fluted face provided with the guiding ribs 32 which terminate just beyond the shoulder 33 between the recessed portions 29 and 30 and then is provided with an outwardly flaring recess 34, from the shoulder 35 at the outer ends of the ribs 32 to the outer end of the sleeve 31.

In the chamber 25, and consequently in the sleeve 31, there is rotatably mounted the feed screw or advancing worm 36 which has a diminished annulus 37 journalled in the end thrust bearing 38. The driven shaft 39 journalled in the opening 4 in the enlargement 2 is screw threadedly connected to the worm 36 as shown. The front end of the worm 36, see Fig. 1, has a diminished internal screw threaded portion 40 with the key 41 to receive the cutter unit 42 having three cutting elements adjacent one another including the small cutting unit 43, the large cutting unit 44 and the intermediate cutting unit 45 in between the cutting units 43 and 44. The large cutting unit 44 has, see Fig. 1, interrupted bearing faces 46 between the teeth 63 to engage the cylindrical bearing face 47 in the sleeve 31 adjacent the ends of the ribs 32. The cutting unit 42 is secured in place by the anchoring unit 48 including the threaded portion 49 screw threadedly connected in the chamber of the portion 40, a collar 50 engaging the outer face of the large cutting unit 44 and a polygonal shaped extension 51 to receive the cross shaped cutter 52. On the outside of the cutter 52 there is positioned the perforated disk 53 which is keyed to the sleeve 31 by the key 54 as shown in Fig. 1. The locking ring 28 in turn has an inwardly extending annular flange 55 engaging the outer portion of the disk 53 and anchoring it in position and in turn also the cutter 52 against removal from the support 51. The space between the cutters 44 and 52 provided by the collar 50 is provided to form a mixing chamber, the meat particles after leaving the cutter 44 through the openings formed between the ribs 32 and the successive teeth of the cutter 44 being wiped off or deflected by the fingers 56 and 57 extending through the openings 59 formed in the outer end portion of the casing 11 and the adjacent portion of the sleeve 31. The casing portion 12 may be provided with spring pressed balls (not shown) to cooperate with the recesses 61 in the pins 56 and 57 to anchor the same either in deflecting position for agitating the food particles in the mixing chamber formed between the cutters 44 and 52, or else in position to clear the sleeve 31 and enable the sleeve 31 as well as the cutter 44 and associated parts to be withdrawn from, or separated from, the casing 11.

One of the main features of the present invention results from the fact that in the interest of cleaning there will be afforded a clear passage through the casing member 11 without pockets and the like, which passage will be cleared when the casing member 11 is removed and the contents of the casing member 11 have been removed therefrom.

It will appear from the foregoing that if the advancing screw 36 is positioned in the section 11, while detached, the projection 15 and the driven shaft 39 may cooperate with the openings 16 and 4, respectively, to index or center the removable section 11, and that then the handle 23 may be turned to draw the sections together into final assembled position.

Figure 4:
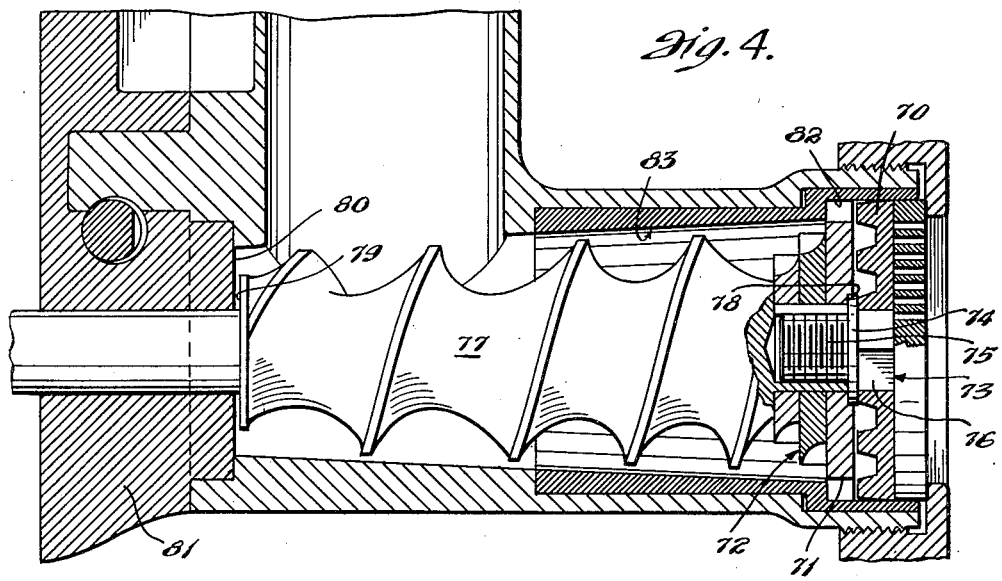
Fig. 4 is a longitudinal section similar to Fig. 1 showing the present invention applied to a meat chopper having a different mixing chamber than that illustrated in Fig. 1.

In the embodiment shown in Fig. 4, it will be noted that the end thrust bearing 38 of the embodiment illustrated in Fig. 1 has been omitted, reliance here being placed upon the end thrust bearing afforded by the teeth 63 on the sleeve 31.

The embodiment shown in Fig. 4 is distinguished from the embodiment shown in Fig. 1 and mainly in omitting the use of any deflecting means, such as the pins 56 and 57 illustrated in Figs. 1 and 3. So that a space may be provided between the final cutter 17 and the large cutter 71 of the precutting unit 72, the anchoring unit 73 includes a collar 74 intermediate the threaded portion 75 and the polygonal portion 76. The threaded portion 75 is screw threadedly connected to the worm 77, the polygonal portion 76 forming a seat 4 and receiving the final cutter 78, the collar 74 resting partly in the annular recess 78 formed in the end of the large cutter 71 and partly protruding beyond the end of the large cutter 71 to form a spacer between the large cutter 71 and the final cutter 78, the outer face of the collar 74 being disposed against the inner face of the final cutter 78. The inner face 79 of the worm 77 here too is spaced from the face 80 of the fixed casing member 81, reliance being placed upon the end thrust bearing afforded by the teeth of the large cutter 71 on the offset portion 82 of the replaceable sleeve 83.

Figure 5:
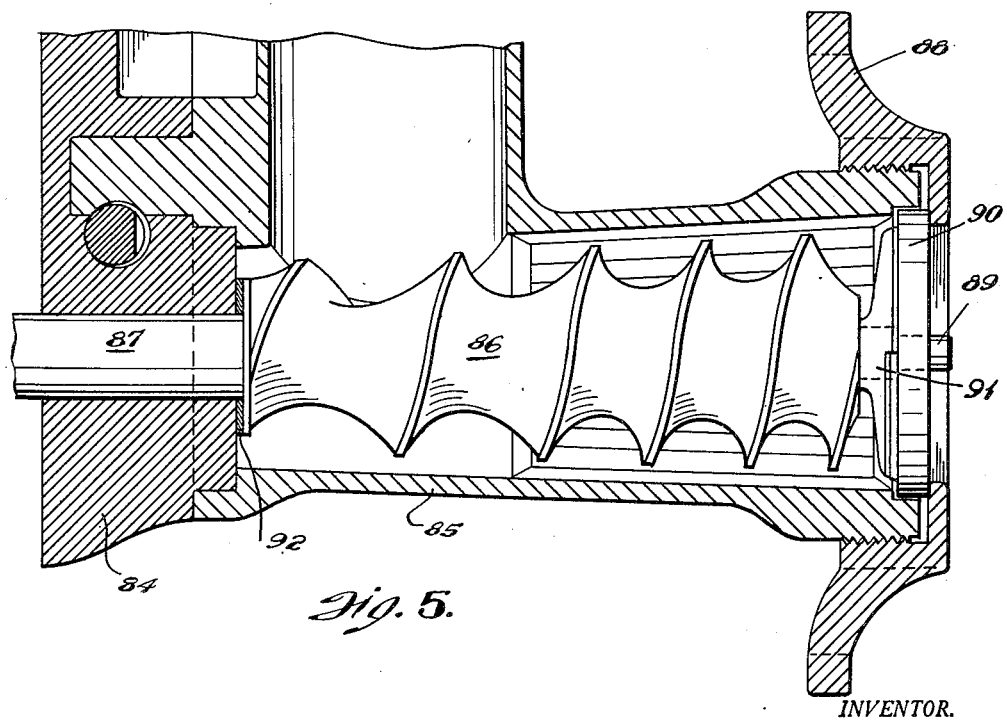
Fig. 5 is a longitudinal section similar to Fig. 1 showing the present invention applied to a conventional meat chopper.

The embodiment shown in Fig. 5 shows how the conventional worm and cutter arrangement can be used with the present two part casing including the fixed casing member 84 and the removable casing member 85. The worm 86 in this embodiment is provided with a stub shaft 87 journalled in the casing member 84 having an anchoring unit 88 connected to the outer end thereof, which worm 86 is provided with a stub shaft 89 journalled in the extrusion plate 90 and having a seat for the cutter 91. In this embodiment, according to convention, the inner end of the worm 86 is provided with thrust bearing 92 interposed between the inner end of the worm 86 and the adjacent face of the casing 84.

It may be well to point out that with power-driven meat choppers now in use, the rear end of the casing of the chopper is mounted on the outside of the motor housing. To prevent sagging of the cutter casing, which would throw the feed screw in the barrel out of alignment with the driving member in the housing, the rear end of the barrel is provided with a long cylindrical or tapered boss which is held in a corresponding cylindrical or tapered hole in the motor housing. In order to provide for such mounting, the rear end of the cutter barrel is closed except for a central bore in the boss for the shaft of the feed screw. Although the cutter casing may be removed from the motor housing by withdrawing the boss at its rear end from the opening in the housing, the closure of the rear end of the barrel makes it difficult to clean all the meat particles out of the barrel. Any meat particles left in the chopper overnight will spoil and will deleteriously affect the taste and sanitary conditions of any fresh supply of meat passed through the chopper. This difficulay may be temporarily eliminated by placing the chopper casing into a refrigerator overnight, but sanitary conditions cannot be maintained unless the cutter barrel is thoroughly cleaned from time to time.

If a meat chopper casing is made open at both ends so that it may easily be cleaned, it cannot be mounted on a motor casing in a conventional manner nor can it provide the usual rear bearing for the shaft of the feed screw. My invention overcomes these difficulties by providing a novel form of casing and a novel support therefor such that an open-ended casing may be effectively but releasably supported by its rear end.

In accordance with this invention, the cutter casing is of L-shape and includes a cylinder or barrel open at both ends and a feed chute entering the rear portion of the barrel. It has at its rear end a contact surface which extends not only across the end of the barrel but also for a considerable distance above the barrel along the rear side of the feed chute. The support for the barrel contains a bearing for the feed screw shaft, and is provided with a corresponding contact surface of considerable height extending across the axis of this bearing. When the two contact surfaces are releasably clamped together, the casing is so securely held against sagging that the axis of its barrel is held perfectly parallel to the axis of a bearing in the support and to the axis of a driving element which may be mounted in the support. The two contact surfaces are provided with spaced interfitting elements which insure clamping the surfaces together in a predetermined relation in which the axis of the barrel is in line with the axis of the bearing in the support.

While the invention is of particular importance in connection with power-driven meat choppers, since it enables a casing which is open at both ends to be supported at one end on a motor housing, it may also be used in any type of meat cutter in which it may be desired to support a cutter casing at its rear end.

To bring out the aforesaid feature of the present invention, there is shown in Fig. 6, an electric motor and gear casing 113 mounted on a bed plate 114 forming part of a housing for the motor. A vertical wall 115 formed integral with the bed plate forms the support for the meat chopper casing 116. On the outer side of the wall 115 is secured a plate 117. A bore 118 extends through the plate 117 and the wall 115 in line with a drive shaft 119 which extends from the gear casing 113, and is journalled therein. The plate 117 provides a contact surface 120 of considerable vertical extent. In the form illustrated, this surface is flat and lies in a plane transverse to the bore 118.

The cutter casing 116 has the form of an L as illustrated. It includes a barrel 123 open at its rear end as well as at its front end and a feed chute 124 near the rear end of the barrel. The casing is provided with a flat contact surface 121 which extends not only across the rear end of the barrel but also up the rear side of the chute 124 so that it is of considerable extent, especially in a vertical direction.

The contact surfaces 120 and 121 are provided with indexing means to bring the contact surfaces together in the predetermined position in which the axis of the barrel 123 of the casing 116 is in line with the bore 118 in the support and the axis of the driving member 119. The indexing elements are located outside the periphery of the inner surface of the barrel so that they do not obstruct the inner end of the barrel when it is removed nor interfere with cleaning. In the form shown in Fig. 6, the indexing elements include a short cylindrical boss 125 projecting from the contact surface 120 and adapted to fit the open inner end of the barrel 123 of the casing 116 as shown in Fig. 6 (an annular groove 17 surrounding the opening in the inner end of the barrel as shown in Fig. 1), and also a projection 126 on the contact surface 121 fitting into a recess 127 in the contact surface 120.

Clamping means such as shown in Figs. 1 and 3 are provided for drawing the contact surface 121 of the casing 116 into contact with the contact surface 120 of the support and locking it against this surface.

The rear bearing for the rotary element, see Fig. 6, is provided by the bore 118 in the fixed support 115, 117. The shaft 130 of the rotary element 131 has a running fit with this bore and projects into it when the contact surface 121 is brought against the contact surface 120. This brings the square end of the shaft 130 into engagement with a square recess on the end of the driving element 119.

It is apparent from the above description that by releasing the clamp, the entire casing 116 may be removed from its support with the rotary element in it. The perforated disk 90 of Fig. 5 may be removed from the outer end of the barrel of the casing and the rotary element withdrawn. The detached casing with its barrel open and completely unobstructed at each end may be easily and thoroughly cleaned with a brush. The barrel is formed to facilitate this cleaning by avoiding on its inner surface transverse or nearly transverse flutes or ridges forming pockets which would obstruct the passage of the brush and form enlodgement for material. The barrel is fluted as shown but the flutes extend longitudinally of the barrel and therefore do not interfere with the cleaning.

After the barrel has been thoroughly cleaned, the casing may be quickly and easily mounted on the support 115, 117 by merely registering its indexing means with those in the support and then clamping its contact surface against the contact surface of the support. The casing is then held so securely that it cannot sag in spite of the fact that it is supported only at one end. As a result, the bearing for the rear end of the rotary member formed on the fixed support and the bearing for the front end of this member carried by the front end of the casing are perfectly alined, and the rotary member is perfectly alined with the driving element in the motor housing.

It is obvious that various changes and modifications may be made to the details of construction without departing from the general spirit of the invention as set forth in the appended claims.

I claim:

1. The means for axially alining the outer bearing for the feed screw in a meat chopper casing with the chamber for receiving the feed screw being substantially co-extensive in area from one open end to the other and with the inner bearing for such feed screw in a supporting bracket and closing the passage for the feed screw, said alining means being characterized by plane engaging faces on the casing and supporting bracket extending radially to the axis of the bearings and snugly interfitting male and female annular conformations on the casing and supporting bracket concentric with the inner bearing, said casing and supporting bracket having extensions above the inner bearing, a supporting pin on one of said extensions above the conformations and a first recess in the other extension snugly receiving said pin, and a locking cam extending into, and carried by, the extension haxing the first recess, and a second recess in said pin receiving said cam and enabling said cam when actuated to draw said extensions into intimate engagement with one another and thereby effectively alining said bearings, said pin and first recess being disposed about midway between the upper ends of said extensions and the lower ends of said casing and supporting bracket.

2. The means set forth in claim 1 characterized by the male annular conformation formed on the bracket and the female annular conformation formed in the casing, and the pin formed on the casing and the first recess formed in the bracket.

3. The means for axially alining the outer bearing in the inner periphery of a meat chopper casing for the feed screw with the chamber for receiving the feed screw being substantially co-extensive in area from one open end to the other and with the inner bearing for said feed screw in a supporting bracket and closing the passage for the feed screw, said alining means being characterized by plane engaging faces on the casing and supporting bracket extending radially to the axis of the bearings and snugly interfitting male and female annular conformations on the casing and supporting bracket concentric with the bearings, said casing and supporting bracket having extensions above the inner bearing, a supporting pin on the extension of said casing above the conformations and extending parallel to the axis of said bearings and a first recess in the extension of said bracket parallel to the axis of said bearings and snugly receiving said pin, and a second pin having a locking cam extending into, and carried by, the extension of said bracket and a second recess in said supporting pin to receive said cam and enabling said cam when said second pin is actuated to draw said extensions into intimate engagement with one another and thereby effectively alining said bearings, said supporting pin and first recess being disposed midway between the upper ends of said extensions and the lower ends of said casing and supporting bracket.

4. The supporting means set forth in claim 3 characterized by the second pin extending at right angles to the supporting pin and beneath the axis of the supporting pin with the second recess in the supporting pin being disposed at the bottom thereof.

ARNOLD W. LUNDELL.

REFERENCES CITED

The following references are of record in the file of this patent:

UNITED STATES PATENTS

| Number | Name | Date |
|---|---|---|
| 353,483 | Deissler | Nov. 30, 1886 |
| 737,783 | Schyia | Sept. 1, 1903 |
| 1,683,679 | Knowlton | Sept. 11, 1928 |
| 2,200,786 | Ardrey | May 14, 1940 |
| 2,222,614 | Gronich | Nov. 26, 1940 |
| 2,445,037 | Richard | July 13, 1948 |

FOREIGN PATENTS

| Number | Country | Date |
|---|---|---|
| 620,312 | Germany | Oct. 18, 1935 |
| 189,097 | Switzerland | Mar. 1, 1937 |